United States Patent
Mueller

(10) Patent No.: US 6,227,554 B1
(45) Date of Patent: May 8, 2001

(54) ADJUSTMENT MECHANISM FOR ALIGNMENT OF A PIVOT BUSHING, TRAILING BEAM AND AXLE

(75) Inventor: Ray A. Mueller, Walnut Grove, MO (US)

(73) Assignee: Reyco Industries, Inc., Springfield, MO (US)

(*) Notice: Subject to any disclaimer, the term of this patent is extended or adjusted under 35 U.S.C. 154(b) by 0 days.

(21) Appl. No.: 09/343,956

(22) Filed: Jun. 30, 1999

(51) Int. Cl.$^7$ .................................................. B62D 1/00
(52) U.S. Cl. .................................. 280/86.757; 280/86.751
(58) Field of Search .................... 280/86.75, 86.751, 280/86.757, 124.116, 86.756

(56) References Cited

U.S. PATENT DOCUMENTS

| | | | |
|---|---|---|---|
| Re. 30,308 | * | 6/1980 | Masser ........................ 280/124.116 |
| Re. 34,659 | * | 7/1994 | Reilly ................................ 280/86.75 |
| 1,706,232 | * | 3/1929 | Hurxthal . | 
| 2,065,071 | * | 12/1936 | Harris ............................. 280/86.751 |
| 2,089,607 | * | 8/1937 | Hill ................................... 280/86.75 |
| 3,229,959 | * | 1/1966 | Smothers . |
| 3,285,622 | * | 11/1966 | Castoe ........................... 280/86.757 |
| 3,361,445 | * | 1/1968 | Harbers ............................ 280/86.75 |
| 4,595,216 | * | 6/1986 | Ware ................................ 280/86.75 |
| 5,046,756 | * | 9/1991 | Hertrick .......................... 280/86.75 |
| 5,118,131 | * | 6/1992 | Manning ...................... 280/124.116 |
| 5,201,898 | * | 4/1993 | Pierce .............................. 280/86.75 |
| 5,683,098 | * | 11/1997 | VanDenberg ..................... 280/86.75 |
| 5,899,470 | * | 5/1999 | Heitzmann ................. 280/86.75 X |

FOREIGN PATENT DOCUMENTS

455868 * 11/1991 (EP) .

* cited by examiner

Primary Examiner—Brian L. Johnson
Assistant Examiner—Bryan Fischmann
(74) Attorney, Agent, or Firm—Cook, Alex, McFarron, Manzo, Cummings & Mehler, Ltd.

(57) ABSTRACT

An adjustment mechanism for alignment of a pivot bushing, trailing beam and axle of a vehicle having a pivot bushing housing mounted on the beam of a vehicle frame. Flanges are mounted on the exterior of the side walls of the bushing housing. The adjusting mechanism includes a nut attached to one of the flanges, the nut positioned to receive the threaded shaft of a bolt extending forward and rearwardly, an aligning plate attached to the bolt, the aligning plate engaging the front wall of the housing to move the threaded bushing rod forwardly and rearwardly upon tightening and loosening of the nut and bolt.

1 Claim, 2 Drawing Sheets

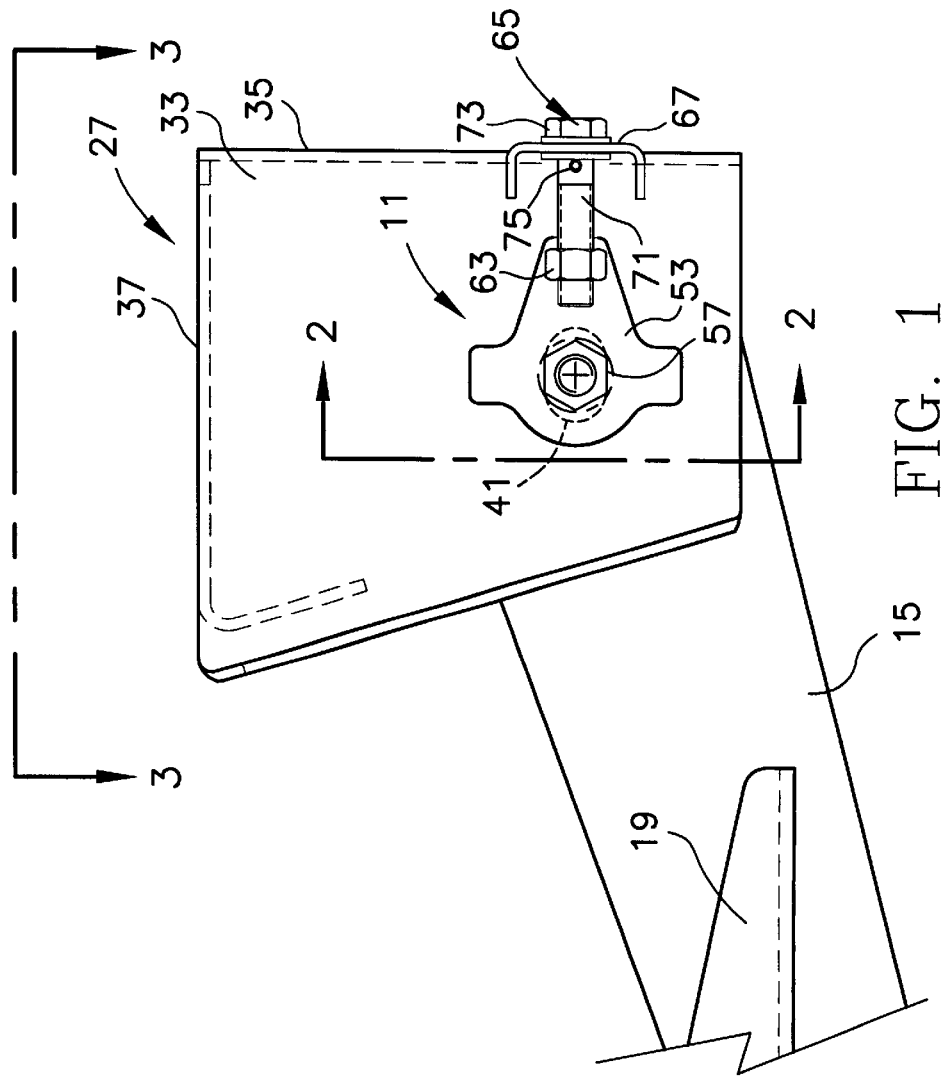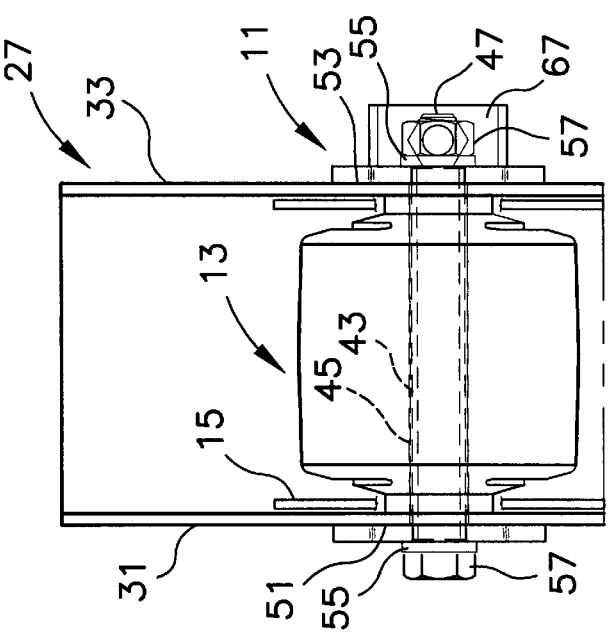

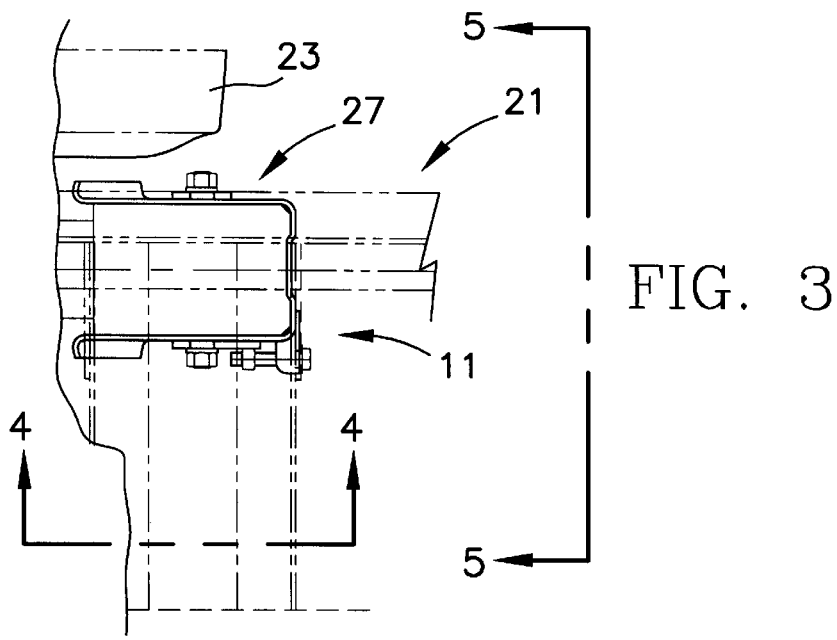
FIG. 3
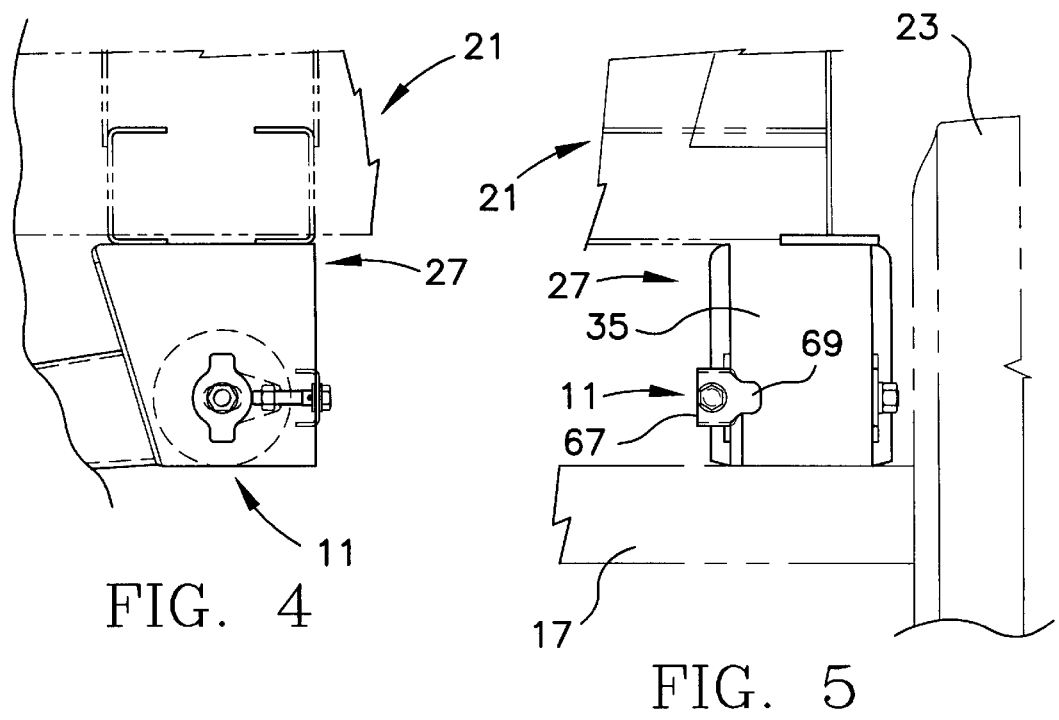
FIG. 4
FIG. 5

ADJUSTMENT MECHANISM FOR ALIGNMENT OF A PIVOT BUSHING, TRAILING BEAM AND AXLE

BACKGROUND AND SUMMARY OF THE INVENTION

This invention is directed to an adjustment mechanism for the alignment of a pivot bushing, trailing beam and axle of a vehicle. Vehicle trailers equipped with air ride suspensions may have an axle mounted on a pair of trailing beams with one trailing beam located on each side of the vehicle frame. The forward end of each trailing beam is pivotally connected to a bushing mounted in a housing which housing depends from a longitudinal extending beam on one side of the trailer frame. The bushing functions as a torsion spring to resist rotation of the trailing beam and to return the trailing beam to its initial position after rotation. Rotation of the trailing beam occurs as the axle moves up and down during travel of the vehicle.

In order to align and position the vehicle axle relative to the vehicle frame, it is necessary to move the pivot bushings on each side of the vehicle in forward and rearwardly directions. Each bushing is equipped with a shaft having non-continuous threads which provide right hand threads at each end of the shaft with each threaded end adapted to receive a locking nut. Elongated slots are formed in the side walls of the pivot bushing housing to receive the ends of the pivot bushing shaft and allow forward and rearwardly adjustment of the pivot bushing shaft upon loosening of the locking nuts. This has been the conventional method of adjusting the pivot bushings, trailing beam and vehicle axle of a vehicle.

The adjustment mechanism of this invention permits more accurate adjustments of a pivot bushing and also permits the adjustment to be made more quickly.

An object of this invention is an adjustment mechanism for a pivot bushing which allows precision adjustment movements of the pivot bushing and its shaft in forward and rearwardly directions through the use of a screw thread adjustment device.

Another object of this invention is an adjustment mechanism for a pivot bushing which positively holds the pivot bushing in its adjusted position until the holding nuts are tightened.

Yet another object of this invention is an adjustment mechanism for a pivot bushing which can be located on a bushing housing either in a location where it is less susceptible to tampering or in a location where it is more readily accessible to a mechanic.

Other objects of this invention will be found in the following specification, claims and drawings.

BRIEF DESCRIPTION OF THE DRAWINGS

The invention is illustrated more or less diagrammatically in the following drawings wherein:

FIG. 1 is a partial side elevational view of the pivot bushing adjusting mechanism of this invention mounted on a vehicle frame with some parts omitted, other parts broken away and some hidden parts shown in dashed lines;

FIG. 2 is a view taken along line 2—2 of FIG. 1 with some parts omitted, some parts broken away and some hidden parts shown in dashed lines;

FIG. 3 is a partial top plan view of pivot bushing adjustment mechanism of FIG. 1 take along line 3—3 of FIG. 1 with some parts of the vehicle and its frame shown in phantom lines;

FIG. 4 is a partial side elevational view similar to FIG. 1 take along line 4—4 of FIG. 3 in showing the relationship of the pivot bushing adjusting mechanism to the vehicle frame; and FIG. 5 is a partial front elevational view of the pivot bushing adjustment mechanism of this invention take along line 5—5 of FIG. 3.

DESCRIPTION OF THE PREFERRED EMBODIMENT

FIGS. 1 and 2 of the drawings show an adjustment mechanism 11 for a pivot bushing 13 for a trailing beam 15 which connects to a vehicle axle 17 (FIG. 5) which sits in an axle saddle 19 of a vehicle frame 21. Wheels 23, as shown in FIGS. 3 and 5, are conventionally mounted on the ends of the axle 17. The pivot bushing is located in a housing 27 which is attached to and extends downwardly from a structural member of the vehicle frame 21.

As can be most clearly seen in FIGS. 1 and 2 of the drawings, the pivotal bushing housing 27 has an outside wall 31 and inside wall 33, a front wall 35 and a top wall 37 with the "notations" outside and "inside" referencing the vehicle frame 21.

Elongated slots 41 are formed in the outside and inside walls 31 and 33 and extend in forwardly and rearwardly directions relative to the vehicle frame. A pivot bushing shaft 43 located in a protective plastic shaft sleeve 45 extends through the elongated slots 41 with the shaft projecting beyond the sleeve 45 as is shown most clearly in FIG. 2 of the drawings. A metal spacer fits over the shaft 43 and is located inside the plastic sleeve 45 but is not shown in the drawings for clarity of illustration. The pivot bushing shaft 43 is formed with right hand threads 47 at opposite ends of the shaft with these threads being non-contiguous at the center of the shaft. A flange 51 fits over the shaft 43 against the outside wall 31 of the housing 25 while a flange 53 fits over the shaft against the inside wall 33 of the housing. Disk spring washers 55 slide over the opposite ends of the pivot bushing shaft and are held by nuts 57 against the flanges 51 and 53 to secure the shaft and the bushing in position.

The precision adjustment mechanism 11 of this invention includes a nut 63 welded to the flange 53 as shown most clearly in FIGS. 1, 3 and 4 of the drawings. A bolt 65 threads into the nut 63 and supports a channel shape aligning plate 67. This aligning plate has a tab 69 which is fastened to the front wall 35 of the bushing housing 27. As can best be seen in FIG. 1 of the drawings, the bolt 65 includes a threaded body 71 which fits into a hex head 73 of the bolt with the hex head being held against the aligning plate 67 by a rolled spring pin 75.

To move the vehicle axle 17 forwardly or rearwardly for adjustment, it is first necessary to loosen the locking nuts 57 at the opposite ends of the bushing shaft 43. The pivot bushings 13 can be adjusted one at a time on opposite sides of the vehicle frame 29 or they can be adjusted simultaneously. Upon loosening of the locking nuts, the mechanic manipulates the precision adjustment mechanism 11 by turning the hex head 73 of the adjustment bolt 65, using a suitable wrench if necessary, to move the pivot bushing shaft 43 and the pivot bushing 13 in either a forwardly or rearwardly direction relative to the vehicle frame 29. When the pivot bushing shaft has been moved to its desired position of adjustment, the locking nuts 57 are tightened against the disk washers 55 to secure the shaft 43 and the pivot bushing 13 in its adjusted position.

What is claimed is:

1. An adjustment mechanism for alignment of a pivot bushing, trailing beam and axle of a vehicle, said mechanism including:

a pivot bushing housing mounted on a vehicle frame, said bushing housing having an outside side wall and an inside side wall, an elongated slot extending forwardly and rearwardly of said vehicle frame formed in each of said side walls in alignment with each other, a front wall formed as a portion of said bushing housing and connecting said side walls of said housing, a pivot bushing positioned in said bushing housing, a threaded, pivot bushing rod extending through said pivot bushing and through said elongated slots, at least one flange mounted on the exterior of one of said side walls of said housing, said pivot bushing rod being secured by nuts attached thereto and engaging said at least one flange to engage said side walls of said housing, said at least one flange having a nut attached thereto which is positioned to receive a shaft of a forwardly and rearwardly aligned bolt, and an aligning plate attached to said bolt, said aligning plate attached to said front wall of said bushing housing.

* * * * *